United States Patent [19]
Olarig et al.

[11] Patent Number: 5,937,173
[45] Date of Patent: Aug. 10, 1999

[54] DUAL PURPOSE COMPUTER BRIDGE INTERFACE FOR ACCELERATED GRAPHICS PORT OR REGISTERED PERIPHERAL COMPONENT INTERCONNECT DEVICES

[75] Inventors: Sompong Paul Olarig, Cypress; Dwight D. Riley; Ronald Timothy Horan, both of Houston, all of Tex.

[73] Assignee: Compaq Computer Corp., Houston, Tex.

[21] Appl. No.: 08/873,420

[22] Filed: Jun. 12, 1997

[51] Int. Cl.$^6$ .................................................. G06F 13/00
[52] U.S. Cl. .......................... 395/306; 395/308; 395/309
[58] Field of Search .............................. 395/306–311, 882

[56] References Cited

U.S. PATENT DOCUMENTS

| 5,721,839 | 2/1998 | Callison et al. | 395/308 |
| 5,740,381 | 4/1998 | Yen | 395/293 |
| 5,771,359 | 6/1998 | Gallaway et al. | 395/308 |

*Primary Examiner*—Ayaz R. Sheikh
*Assistant Examiner*—Ario Etienne
*Attorney, Agent, or Firm*—Paul N. Katz; Ronald L. Chichester; Frohwitter

[57] ABSTRACT

A multiple use core logic chip set is provided in a computer system that may be configured either as a bridge between an accelerated graphics port ("AGP") bus and host and memory buses, as a bridge between an additional registered peripheral component interconnect ("RegPCI") bus and the host and memory buses, or as a bridge between a primary PCI bus and an additional RegPCI bus. The function of the multiple use chip set is determined at the time of manufacture of the computer system or in the field whether an AGP bus bridge or an additional registered PCI bus bridge is to be implemented. The multiple use core logic chip set has an arbiter having Request ("REQ") and Grant ("GNT") signal lines for each PCI device utilized on the additional registered PCI bus. Selection of the type of bus bridge (AGP or RegPCI) in the multiple use core logic chip set may be made by a hardware signal input, or by software during computer system configuration or power on self test ("POST"). Software configuration may also be determined upon detection of either an AGP or a RegPCI device connected to the common AGP/RegPCI bus.

31 Claims, 15 Drawing Sheets

| AGP Pin # | | AGP only | AGP & PCI | PCI only | 3.3V PCI Pin # | |
|---|---|---|---|---|---|---|
| 1 | A | | 12V | | 2 | A |
| 1 | B | SPARE | | | | |
| 2 | A | SPARE | | | | |
| 2 | B | | 5.0V | | 5 | A |
| 3 | A | RESERVED GND | | | | |
| 3 | B | | 5.0V | | 5 | B |
| 4 | A | USB- | | | | |
| 4 | B | USB+ | | | | |
| 5 | A | | GND | | 3 | B |
| 5 | B | | GND | | 18 | A |
| 6 | A | | INTA# | | 6 | A |
| 6 | B | | INTB# | | 7 | B |
| 7 | A | | RST# | | 15 | A |
| 7 | B | CLK | | | | |
| 8 | A | | GNT# | | 17 | A |
| 8 | B | | REQ# | | 18 | B |
| 9 | A | | VCC3.3 | | 10 | A |
| 9 | B | | VCC3.3 | | 16 | A |
| 10 | A | ST1 | | | | |
| 10 | B | ST0 | | | | |
| 11 | A | | RESERVED | | 9 | A |
| 11 | B | ST2 | | | | |
| 12 | A | PIPE# | | | | |
| 12 | B | RBF# | | | | |
| 13 | A | | GND | | 15 | B |
| 13 | B | | GND | | 17 | B |
| 14 | A | SPARE | | | | |
| 14 | B | SPARE | | | | |
| 15 | A | SBA1 | | | | |
| 15 | B | SBA0 | | | | |
| 16 | A | | VCC3.3 | | 19 | B |
| 16 | B | VCC3.3 | | | | |
| 17 | A | SBA3 | | | | |
| 17 | B | SBA2 | | | | |
| 18 | A | | RESERVED | | 10 | B |
| 18 | B | SB_STB | | | | |
| 19 | A | GND | | | | |
| 19 | B | GND | | | | |
| 20 | A | SBA5 | | | | |
| 20 | B | SBA4 | | | | |
| 21 | A | SBA7 | | | | |
| 21 | B | SBA6 | | | | |
| 22 | A | | KEY | | 12 | A |
| 22 | B | | KEY | | 12 | B |
| 23 | A | | KEY | | 13 | A |
| 23 | B | | KEY | | 13 | B |

FIGURE 3A

| AGP Pin # | | AGP only | AGP & PCI | PCI only | 3.3V PCI Pin # | |
|---|---|---|---|---|---|---|
| 24 | A | KEY | | | | |
| 24 | B | KEY | | | | |
| 25 | A | KEY | | | | |
| 25 | B | KEY | | | | |
| 26 | A | | AD30 | | 20 | A |
| 26 | B | | AD31 | | 20 | B |
| 27 | A | | AD28 | | 22 | A |
| 27 | B | | AD29 | | 21 | B |
| 28 | A | | VCC3.3 | | 21 | A |
| 28 | B | | VCC3.3 | | 25 | B |
| 29 | A | | AD26 | | 23 | A |
| 29 | B | | AD27 | | 23 | B |
| 30 | A | | AD24 | | 25 | A |
| 30 | B | | AD25 | | 24 | B |
| 31 | A | | GND | | 22 | B |
| 31 | B | | GND | | 24 | A |
| 32 | A | | RESERVED | | 11 | A |
| 32 | B | AD_STB1 | | | | |
| 33 | A | | C/BE_3# | | 26 | B |
| 33 | B | | AD23 | | 27 | B |
| 34 | A | Vddq3.3 | | | | |
| 34 | B | Vddq3.3 | | | | |
| 35 | A | | AD22 | | 28 | A |
| 35 | B | | AD21 | | 29 | B |
| 36 | A | | AD20 | | 29 | A |
| 36 | B | | AD19 | | 30 | B |
| 37 | A | | GND | | 28 | B |
| 37 | B | | GND | | 30 | A |
| 38 | A | | AD18 | | 31 | A |
| 38 | B | | AD17 | | 32 | B |
| 39 | A | | AD16 | | 32 | A |
| 39 | B | | C/BE_2# | | 33 | B |
| 40 | A | Vddq3.3 | | | | |
| 40 | B | Vddq3.3 | | | | |
| 41 | A | | FRAME# | | 34 | A |
| 41 | B | | IRDY# | | 35 | B |
| 42 | A | | | | | |
| 42 | B | | | | | |
| 43 | A | | GND | | 34 | B |
| 43 | B | | GND | | 35 | A |
| 44 | A | | | | | |
| 44 | B | | | | | |
| 45 | A | | VCC3.3 | | 27 | A |
| 45 | B | | VCC3.3 | | 31 | B |
| 46 | A | | DEVSEL# | | 37 | B |
| 46 | B | | TRDY# | | 36 | A |

FIGURE 3B

| AGP Pin # 302 | | AGP only 304 | AGP & PCI 306 | PCI only | 3.3V PCI Pin # | |
|---|---|---|---|---|---|---|
| 47 | A | | STOP# | | 38 | A |
| 47 | B | Vddq3.3 | | | | |
| 48 | A | SPARE | | | | |
| 48 | B | | PERR# | | 40 | B |
| 49 | A | | GND | | 37 | A |
| 49 | B | | GND | | 38 | B |
| 50 | A | | PAR | | 43 | A |
| 50 | B | | SERR# | | 42 | B |
| 51 | A | | AD15 | | 44 | A |
| 51 | B | | C/BE 1# | | 44 | B |
| 52 | A | Vddq3.3 | | | | |
| 52 | B | Vddq3.3 | | | | |
| 53 | A | | AD13 | | 46 | A |
| 53 | B | | AD14 | | 45 | B |
| 54 | A | | AD11 | | 47 | A |
| 54 | B | | AD12 | | 47 | B |
| 55 | A | | GND | | 42 | A |
| 55 | B | | GND | | 46 | B |
| 56 | A | | AD9 | | 49 | A |
| 56 | B | | AD10 | | 48 | B |
| 57 | A | | C/BE 0# | | 52 | A |
| 57 | B | | AD8 | | 52 | B |
| 58 | A | Vddq3.3 | | | | |
| 58 | B | Vddq3.3 | | | | |
| 59 | A | | RESERVED | | 14 | A |
| 59 | B | AD STB0 | | | | |
| 60 | A | | AD6 | | 54 | A |
| 60 | B | | AD7 | | 53 | B |
| 61 | A | | GND | | 48 | A |
| 61 | B | | GND | | 56 | A |
| 62 | A | | AD4 | | 55 | A |
| 62 | B | | AD5 | | 55 | B |
| 63 | A | | AD2 | | 57 | A |
| 63 | B | | AD3 | | 56 | B |
| 64 | A | Vddq3.3 | | | | |
| 64 | B | Vddq3.3 | | | | |
| 65 | A | | AD0 | | 58 | A |
| 65 | B | | AD1 | | 58 | B |
| 66 | A | SMB1 | | | | |
| 66 | B | SMB0 | | | | |

FIGURE 3C

| AGP Pin # | | AGP only | AGP & PCI (306) | PCI only (408) | 3.3V PCI Pin # (402) | |
|---|---|---|---|---|---|---|
| | | | | TRST# | 1 | A |
| | | | | −12V | 1 | B |
| 1 | A | | 12V | | 2 | A |
| | | | | TCK | 2 | B |
| | | | | TMS | 3 | A |
| 5 | A | | GND | | 3 | B |
| | | | | TDI | 4 | A |
| | | | | TDO | 4 | B |
| 2 | B | | 5.0V | | 5 | A |
| 3 | B | | 5.0V | | 5 | B |
| 6 | A | | INTA# | | 6 | A |
| | | | | 5V | 6 | B |
| | | | | INTC# | 7 | A |
| 6 | B | | INTB# | | 7 | B |
| | | | | 5V | 8 | A |
| | | | | INTD# | 8 | B |
| 11 | A | | RESERVED | | 9 | A |
| | | | | PRSNT1# | 9 | B |
| 9 | A | | VCC3.3 | | 10 | A |
| 18 | A | | RESERVED | | 10 | B |
| 32 | A | | RESERVED | | 11 | A |
| | | | | PRSNT2# | 11 | B |
| 22 | A | | KEY | | 12 | A |
| 22 | B | | KEY | | 12 | B |
| 23 | A | | KEY | | 13 | A |
| 23 | B | | KEY | | 13 | B |
| 59 | A | | RESERVED | | 14 | A |
| | | | | RESERVED | 14 | B |
| 7 | A | | RST# | | 15 | A |
| 13 | A | | GND | | 15 | B |
| 9 | B | | VCC3.3 | | 16 | A |
| 8 | A | | GNT# | | 17 | A |
| 13 | B | | GND | | 17 | B |
| 5 | B | | GND | | 18 | A |
| 8 | B | | REQ# | | 18 | B |
| | | | | RESERVED | 19 | A |
| 16 | A | | VCC3.3 | | 19 | B |
| 26 | A | | AD30 | | 20 | A |
| 26 | B | | AD31 | | 20 | B |
| 28 | A | | VCC3.3 | | 21 | A |
| 27 | B | | AD29 | | 21 | B |
| 27 | A | | AD28 | | 22 | A |
| 31 | A | | GND | | 22 | B |
| 29 | A | | AD26 | | 23 | A |
| 29 | B | | AD27 | | 23 | B |

FIGURE 4A

| AGP Pin # | | AGP only | AGP & PCI (306) | PCI only (408) | 3.3V PCI Pin # (402) | |
|---|---|---|---|---|---|---|
| 31 | B | | GND | | 24 | A |
| 30 | B | | AD25 | | 24 | B |
| 30 | A | | AD24 | | 25 | A |
| 28 | B | | VCC3.3 | | 25 | B |
| | | | | IDSEL | 26 | A |
| 33 | A | | C/BE 3# | | 26 | B |
| 45 | A | | VCC3.3 | | 27 | A |
| 33 | B | | AD23 | | 27 | B |
| 35 | A | | AD22 | | 28 | A |
| 37 | A | | GND | | 28 | B |
| 36 | A | | AD20 | | 29 | A |
| 35 | B | | AD21 | | 29 | B |
| 37 | B | | GND | | 30 | A |
| 36 | B | | AD19 | | 30 | B |
| 38 | A | | AD18 | | 31 | A |
| 45 | B | | VCC3.3 | | 31 | B |
| 39 | A | | AD16 | | 32 | A |
| 38 | B | | AD17 | | 32 | B |
| | | | | VCC3.3 | 33 | A |
| | | | | VCC3.3 | 33 | B |
| 39 | B | | C/BE 2# | | 33 | B |
| 41 | A | | FRAME# | | 34 | A |
| 43 | A | | GND | | 34 | B |
| 43 | B | | GND | | 35 | A |
| 41 | B | | IRDY# | | 35 | B |
| 46 | B | | TRDY# | | 36 | A |
| 49 | A | | GND | | 37 | A |
| 46 | A | | DEVSEL# | | 37 | B |
| 47 | A | | STOP# | | 38 | A |
| 49 | B | | GND | | 38 | B |
| | | | | VCC3.3 | 39 | A |
| | | | | LOCK# | 39 | B |
| | | | | SDONE | 40 | A |
| 48 | B | | PERR# | | 40 | B |
| | | | | SBO# | 41 | A |
| | | | | VCC3.3 | 41 | B |
| 55 | A | | GND | | 42 | A |
| 50 | B | | SERR# | | 42 | B |
| 50 | A | | PAR | | 43 | A |
| | | | | VCC3.3 | 43 | B |
| 51 | A | | AD15 | | 44 | A |
| 51 | B | | C/BE 1# | | 44 | B |
| | | | | VCC3.3 | 45 | A |
| 53 | B | | AD14 | | 45 | B |
| 53 | A | | AD13 | | 46 | A |
| 55 | B | | GND | | 46 | B |

FIGURE 4B

| AGP Pin # | | AGP only | AGP & PCI | PCI only | 3.3V PCI Pin # | |
|---|---|---|---|---|---|---|
| 54 | A | | AD11 | | 47 | A |
| 54 | B | | AD12 | | 47 | B |
| 61 | A | | GND | | 48 | A |
| 56 | B | | AD10 | | 48 | B |
| 56 | A | | AD9 | | 49 | A |
| | | | | M66EN | 49 | B |
| | | | | GND | 50 | A |
| | | | | GND | 50 | B |
| | | | | GND | 51 | A |
| | | | | GND | 51 | B |
| 57 | A | | C/BE 0# | | 52 | A |
| 57 | B | | AD8 | | 52 | B |
| | | | | VCC3.3 | 53 | A |
| 60 | B | | AD7 | | 53 | B |
| 60 | A | | AD6 | | 54 | A |
| | | | | VCC3.3 | 54 | B |
| 62 | A | | AD4 | | 55 | A |
| 62 | B | | AD5 | | 55 | B |
| 61 | B | | GND | | 56 | A |
| 63 | B | | AD3 | | 56 | B |
| 63 | A | | AD2 | | 57 | A |
| | | | | GND | 57 | B |
| 65 | A | | AD0 | | 58 | A |
| 65 | B | | AD1 | | 58 | B |
| | | | | VCC3.3 | 59 | A |
| | | | | VCC3.3 | 59 | B |
| | | | | REQ64# | 60 | A |
| | | | | ACK64# | 60 | B |
| | | | | 5V | 61 | A |
| | | | | 5V | 61 | B |
| | | | | 5V | 62 | A |
| | | | | 5V | 62 | B |
| | | | | GND | 63 | A |
| | | | | RESERVED | 63 | B |
| | | | | RESERVED | 63 | B |
| | | | | C/BE 7# | 64 | A |
| | | | | GND | 64 | B |
| | | | | C/BE 5# | 65 | A |
| | | | | C/BE 6# | 65 | B |
| | | | | VCC3.3 | 66 | A |
| | | | | C/BE 4# | 66 | B |
| | | | | PAR64 | 67 | A |
| | | | | GND | 67 | B |
| | | | | AD62 | 68 | A |
| | | | | AD63 | 68 | B |

FIGURE 4C

| AGP Pin # | AGP only | AGP & PCI | PCI only | 3.3V PCI Pin # | |
|---|---|---|---|---|---|
| | | | GND | 69 | A |
| | | | AD61 | 69 | B |
| | | | AD60 | 70 | A |
| | | | VCC3.3 | 70 | B |
| | | | AD58 | 71 | A |
| | | | AD59 | 71 | B |
| | | | GND | 72 | A |
| | | | AD57 | 72 | B |
| | | | AD56 | 73 | A |
| | | | GND | 73 | B |
| | | | AD54 | 74 | A |
| | | | AD55 | 74 | B |
| | | | VCC3.3 | 75 | A |
| | | | AD53 | 75 | B |
| | | | AD52 | 76 | A |
| | | | GND | 76 | B |
| | | | AD50 | 77 | A |
| | | | AD51 | 77 | B |
| | | | GND | 78 | A |
| | | | AD49 | 78 | B |
| | | | AD48 | 79 | A |
| | | | VCC3.3 | 79 | B |
| | | | AD46 | 80 | A |
| | | | AD47 | 80 | B |
| | | | GND | 81 | A |
| | | | AD45 | 81 | B |
| | | | AD44 | 82 | A |
| | | | GND | 82 | B |
| | | | AD42 | 83 | A |
| | | | AD43 | 83 | B |
| | | | VCC3.3 | 84 | A |
| | | | AD41 | 84 | B |
| | | | AD40 | 85 | A |
| | | | GND | 85 | B |
| | | | AD38 | 86 | A |
| | | | AD39 | 86 | B |
| | | | GND | 87 | A |
| | | | AD37 | 87 | B |
| | | | AD36 | 88 | A |
| | | | VCC3.3 | 88 | B |
| | | | AD34 | 89 | A |
| | | | AD35 | 89 | B |
| | | | GND | 90 | A |
| | | | AD33 | 90 | B |
| | | | AD32 | 91 | A |
| | | | GND | 91 | B |

FIGURE 4D

| AGP Pin # | AGP only | AGP & PCI | PCI only | 3.3V PCI Pin # | |
|---|---|---|---|---|---|
| | | | RESERVED | 92 | A |
| | | | RESERVED | 92 | B |
| | | | GND | 93 | A |
| | | | RESERVED | 93 | B |
| | | | RESERVED | 94 | A |
| | | | GND | 94 | B |

FIGURE 4E

DUAL PURPOSE COMPUTER BRIDGE INTERFACE FOR ACCELERATED GRAPHICS PORT OR REGISTERED PERIPHERAL COMPONENT INTERCONNECT DEVICES

CROSS REFERENCE TO RELATED PATENT APPLICATION

This patent application is related to commonly owned U.S. patent application Ser. No. 08/853,289, filed May 9, 1997, entitled "Dual Purpose Apparatus, Method And System For Accelerated Graphics Port And Peripheral Component Interconnect" by Ronald T. Horan and S. Paul Olarig, and is hereby incorporated by reference.

BACKGROUND OF THE INVENTION

1. Field of the Invention

The present invention relates to computer systems using a bus bridge(s) to interface a central processor(s), video graphics processor, memory and input-output peripherals together, and more particularly, in utilizing the same logic circuits as a bus bridge for either an accelerated graphics port or an additional registered peripheral component interconnect bus.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1, the disclosures of which are hereby incorporated by reference. These PCI specifications are available from the PCI Special Interest Group, P.O Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Digital Equipment Corporation, Cyrix, IBM and Motorola.

These sophisticated microprocessors have, in turn, made possible running complex application programs using advanced three dimensional ("3-D") graphics for computer aided drafting and manufacturing, engineering simulations games and the like. Increasingly complex 3-D graphics require higher speed access to ever larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, the disclosure of which is hereby incorporated by reference.

The AGP interface specification uses the 66 MHz PCI (Revision 2.1) as an operational baseline, with three performance enhancements to the PCI specification which are used to optimize the AGP specification for high performance 3-D graphics applications. These enhancements are: 1) pipelined memory read and write operations, 2) demultiplexing of address and data on the AGP bus by use of sideband signals, and 3) data transfer rates of 133 MHz for data throughput in excess of 500 megabytes per second ("MB/sec."). The remaining AGP specification does not modify the PCI 2.1 Specification, but rather provides a range of graphics-oriented performance enhancements for use by the 3-D graphics hardware and software designers. The AGP specification is neither meant to replace nor diminish full use of the PCI standard in the computer system. The AGP specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. This adds additional costs to a personal computer system, but is well worth it if 3-D graphics are utilized. Some personal computer uses such as a network server do not require 3-D graphics, but would greatly benefit from having an additional PCI bus with multiple PCI card slots for accepting additional input-output devices such as a network interface card(s) ("NIC"), PCI/PCI bridge, PCI/SCSI adapter, PCI/EISA/ISA bridge, a wide area network digital router, multiple head graphics, and the like.

The AGP interface specification defines one host component on the motherboard and one AGP compliant agent either on the computer system motherboard or through a connector on the motherboard. The AGP specification, thus, has only control signals (one Request and one Grant) for a single AGP device, i.e., a video graphics controller. Version 2.1 of the PCI interface specification for 66 MHz operation generally limits the number of 66 MHz PCI plug-in cards to two PCI connectors on the motherboard because of timing constraints such as clock skew, propagation delay, input setup time and valid output delay. Typically, the 66 MHz PCI 2.1 Specification requires the sourcing agent to use a late-arriving signal with a setup time of only 3 nanoseconds ("ns") to determine whether to keep the same data on the bus or advance to the next data, with a 6 ns maximum output delay. Current state of the art Application Specific Integrated Circuits ("ASIC") using 0.5 micron technology have difficulty meeting the aforementioned timing requirements. Even using the newer and more expensive 0.35 micron ASIC technology may be marginal in achieving the timing requirements for the 66 MHz PCI bus.

High speed register-to-register transfer of address, data and control signals on a PCI bus running at 66 MHz or faster has been proposed as an extension to the existing 66 MHz PCI 2.1 Specification. In Registered PCI ("RegPCI") mode all signals are sampled on the rising edge of the PCI bus clock and only the registered version of these signals are used inside the RegPCI devices. In the current PCI 2.1 Specification, there are many cases where the state of an input signal setting up to a particular clock edge affects the state of an output signal after that same clock edge. This type of input-output signal behavior is not possible in a registered interface, thus RegPCI introduces the concept of a clock-pair boundary which replaces some single-clock-edges where control signals change. Timing on the RegPCI bus is not as critical as the aforementioned 66 MHz PCI 2.1 Specification, even when the RegPCI bus runs faster than 66 MHz. Thus, a 66 MHz or faster RegPCI bus may have four PCI card slots instead of the maximum of two card slots specified for the non-registered 66 MHz PCI bus. Registered PCI is disclosed in commonly owned co-pending U.S. patent application Ser. No. 08/873,636, filed Jun. 12, 1997, entitled "Registered PCI" by Dwight Riley and Christopher J. Pettey, and is hereby incorporated by reference.

AGP and PCI devices serve different purposes and the respective interface cards (e.g., AGP 3-D video controller and PCI NIC) are not physically or electrically interchangeable even though there is some commonality of signal functions between the AGP and PCI interface specifications. While AGP capabilities are very desirable in a personal computer utilizing 3-D graphics, it is wasteful and redundant for those personal computers not requiring 3-D capabilities. The cost/performance (i.e., flexibility of the computer for a given price) of a personal computer is of paramount importance for commercial acceptance in the market place. In today's competitive computer industry, technical performance alone does not guarantee commercial success. Technical performance of any personal computer product must be maximized while constantly reducing its manufacturing costs. To achieve a high performance to cost ratio, commonality of components and high volume of use are key factors. Thus, commonality of components such as logic circuits, printed circuit boards, microprocessors, computer boxes and power supplies, will drive the costs down for both workstations and servers. Also the high end workstations and network servers would benefit if one generic model of a personal computer could be effectively used in either capacity. Further benefits in reducing costs may be realized by using common components in portable and desktop (consumer and low end business) computers.

The PCI 2.1 Specification allows for a 33 MHz or 66 MHz, 32 bit PCI bus; and a 33 Mhz or 66 MHz, 64 bit PCI bus. The 33 MHz, 32 bit PCI is capable of up to 133 megabytes per second ("MB/s") peak and 50 MB/s typical, and the 66 MHz, 32 bit PCI bus; and the 33 MHz, 64 bit PCI bus are capable of up to 266 MB/s peak. The AGP bus is capable of up to 532 MB/s peak. PCI interface card vendors are moving toward either 66 MHz, 32 bit, or 33 MHz, 64 bit compatible PCI cards for the enhance data throughput performance.

The PCI specification, however, only allows two PCI device cards (two PCI connectors) on a 66 MHz PCI bus. The AGP specification comprises a superset of the 66 MHz, 32 bit PCI 2.1 Specification, but has even higher throughput when in its 2x mode. The RegPCI allows PCI bus operation at 66 MHz with more than two PCI device cards.

What is needed is an apparatus, method, and system for a personal computer that may provide an additional RegPCI bus when an AGP bus is not needed by utilizing multiple use high production volume logic and interface circuits having the capability of providing either a 66 MHz RegPCI or an AGP interface.

OBJECTS OF THE INVENTION

It is therefore an object of the present invention to provide a core logic chip set configurable for an additional RegPCI bus when an AGP bus is not needed by utilizing multiple use high production volume logic and interface circuits having the capability of providing either a RegPCI or an AGP interface.

It is a further object of the present invention to provide a core logic chip set that may be used in a personal computer system for an additional 66 MHz, 32 bit or 64 bit RegPCI bus when an AGP bus is not needed by utilizing multiple use high production volume logic and interface circuits having the capability of providing either a RegPCI or an AGP interface.

It is another object to provide a 66 MHz RegPCI bus interface capable of utilizing at least four PCI card slots comprising standard PCI connectors.

It is another object to use an arbiter of the multiple use high production volume logic and interface circuits for either an AGP device or a plurality of RegPCI devices.

It is a further object of the present invention to provide a method and system for programming a core logic chip set to be a bridge between an additional RegPCI bus and the host and memory buses.

It is another object to use one of the arbiters of the multiple use core logic chip set for arbitration of a plurality of PCI devices on the additional RegPCI bus.

It is yet a further object to provide additional request and grant lines for each additional PCI card slot and PCI device on the additional RegPCI bus.

SUMMARY OF THE INVENTION

The above and other objects of the present invention are satisfied, at least in part, by providing in a computer system a multiple use core logic chip set that may be configured as either a bridge between an AGP bus and host and memory buses, or as a bridge between an additional PCI bus having RegPCI capabilities and the host and memory buses. The function of the multiple use chip set is determined at the time of manufacture of the computer system or may be changed in the field to an AGP bus bridge or an additional PCI bus bridge having RegPCI capabilities. The core logic chip set has provisions for the AGP and RegPCI interface signals and is adapted for connection to either an AGP bus or an additional PCI bus having RegPCI capabilities. Selection of which type of bus bridge (AGP or RegPCI) the core logic of the present invention is to assume may be determined by the type of computer system printed circuit motherboard utilized with the core logic chip set. The core logic chip set of the present invention uses one of its arbiters for the additional RegPCI bus, and has Request ("REQ") and Grant ("GNT") signal lines for each PCI device (RegPCI or PCI) connected to the additional RegPCI bus.

An embodiment of the invention contemplates a multiple use core logic chip set which may be one or more integrated circuit devices such as an Application Specific Integrated Circuit ("ASIC"), Programmable Logic Array ("PLA") and the like. AGP, RegPCI, or PCI device(s) may be embedded on the computer system motherboard, or may be on a separate card(s) which plugs into a corresponding card edge connector(s) attached to the system motherboard and connected to the multiple use core logic chip set through either an AGP or RegPCI bus. The AGP and PCI card edge connectors are standard AGP and PCI connectors as more fully defined in the respective AGP and PCI specifications.

This multiple use core logic chip set of the present invention may be used in conjunction with a specific use printed circuit motherboard for a workstation, personal computer, portable computer, or a network server. In this embodiment, the type of motherboard may be adapted to apply hardware signal inputs to the core logic chip set for determining the configuration (AGP or additional RegPCI) thereof. The multiple use core logic chip set may also be configured to provide the additional RegPCI bus by software selection and is within the scope of the present invention.

An advantage of the present invention is being able to use the same multiple use core logic chip set across different types of computer products. This feature increases the quantity of these chip sets being manufactured, thus resulting in a corresponding decrease in the cost per chip set.

The multiple use core logic chip set of the present invention may be used in conjunction with a multiple use or universal printed circuit motherboard having provisions for either an AGP card connector or a PCI interface card connector(s). The multiple use core logic chip set is connected to a common AGP/PCI bus on the universal printed circuit motherboard. Either the AGP connector or the PCI connector(s) is attached to the motherboard and is connected to the common AGP/PCI bus. Thus, one motherboard and core logic chip set can satisfy the requirements for a computer system having either an AGP bus and primary PCI bus, or a primary PCI bus and a secondary (additional) RegPCI bus.

As discussed above, the multiple use core logic chip set may have signal inputs for configuring whether it acts as an AGP interface or an additional RegPCI interface, however, it is also contemplated in the present invention that the multiple use chip set may be software programmed to select either the AGP or the additional RegPCI bus function. When the computer system is first powered on and POST begins, the startup configuration software must scan the PCI bus or buses to determine what PCI devices exist and what configuration requirements they may have. This process is commonly referred to as enumerating, scanning, walking or probing the bus. It may also be referred to as the discovery process. The software program which performs the discovery process may be referred to as the PCI bus enumerator.

According to the PCI specification, including Registered PCI, all PCI devices must implement a base set of configuration registers. The PCI device may also implement other required or optional configuration registers defined in the PCI specification. The PCI specification also defines configuration registers and information to be contained therein for a PCI compliant device so as to indicate its capabilities and system requirements. Once the information for all of the bus devices are determined, the core logic may be configured as an additional RegPCI bus interface by the startup software. This software also determines whether the PCI devices operate at 33 MHz or 66 MHz, and if the PCI devices are RegPCI compliant.

An advantage of the present invention is that software may determine at POST whether the AGP or additional RegPCI bus is to be supported by the core logic chip set. This feature makes the core logic chip set of the present invention compatible with any computer system used as a workstation, personal computer, portable, or network server by utilizing the appropriate system motherboard having provisions for the additional RegPCI bus and PCI card connector(s).

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIGS. 3A–3C are tables of the AGP signals and the corresponding AGP connector pin outs;

FIGS. 4A–4E are tables of the 66 MHz, 64 bit RegPCI signals and corresponding RegPCI connector pin outs;

DETAILED DESCRIPTION OF THE PREFERRED EMBODIMENTS

Figure 1:
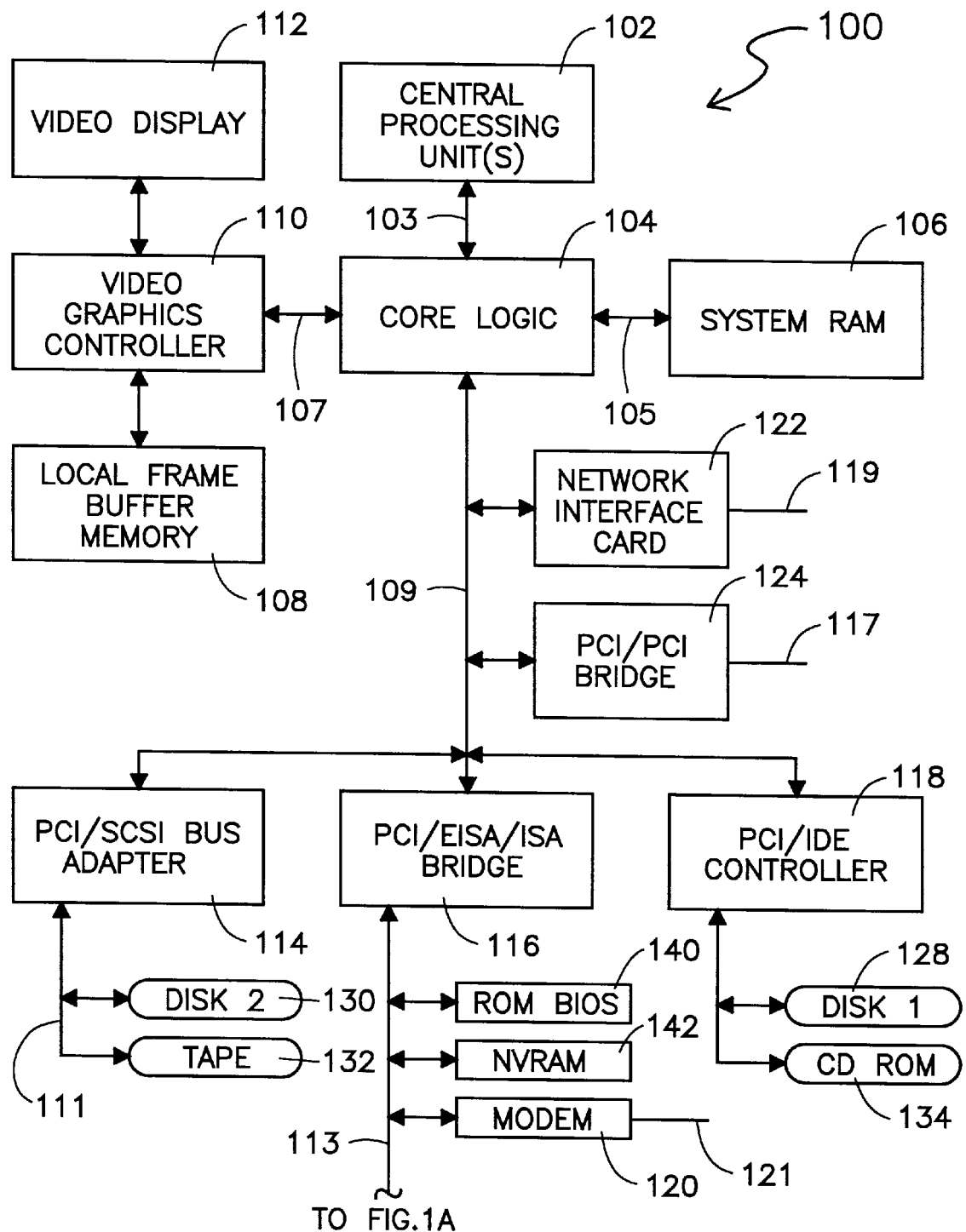
FIGS. 1 and 1A are a schematic block diagram of a computer system.

The present invention is an apparatus, method and system for providing in a computer system a multiple use core logic chip set capable of implementing either a 66 MHz, 32 bit bridge between the host and memory buses and an AGP bus, or a 66 MHz, 32 bit or 64 bit bridge between the host and memory buses and an additional RegPCI bus. Another embodiment of the multiple use core logic chip set of the present invention implements either a bridge between the host and memory buses and an AGP bus, or a bridge between the primary PCI bus and an additional RegPCI bus. Either implementation may be configured by hardware input signals to the multiple use core logic chip set or by software programming thereof.

The AGP bus was developed to have sufficient data bandwidth for a video controller in a computer system, up to 532 megabytes per second ("MB/s"), to run increasingly complex three dimensional ("3-D") graphics applications such as, for example, games and engineering simulations. Not all computer systems, however, need the capability of running 3-D graphics, but would greatly benefit by having an additional PCI bus for NICs, PCI/PCI bridge, PCI/SCSI bridge, and the like. Computers used as network servers require merely simple two dimensional ("2-D") graphics, thus the AGP bus is an overkill for this type of computer.

The AGP interface specification is a derivation or superset of the PCI interface specification and thus shares many common signal functions. Furthermore, the AGP bridge connects to the processor host bus and system memory bus through the computer system core logic chip set, thus it would be desirable to use the chip set logic and driver circuits of the AGP bridge as an additional RegPCI bridge. This enhances the versatility of the core logic chip set and reduces the overall cost of computer systems, both workstation and network servers, by having a common multiple use core logic chip set that could be manufactured in large volumes so as to cover all types of computer configurations.

An advantage of the RegPCI bus is that more than two PCI card slots are available for PCI device cards and that if these PCI devices support the RegPCI specification, then they may operate at a clock speed of 66 MHz. Compatibility with existing PCI devices is also ensured since the RegPCI devices typically will power up in a 33 MHz, standard PCI protocol mode. Only when all devices on the additional RegPCI bus are determined to be capable of the RegPCI mode will any PCI device be configured to use the RegPCI mode at a 66 MHz PCI bus clock speed, The AGP signals not in common with the PCI signals may be reused for some of the signals required by the 64 bit PCI extension, the use of which is contemplated herein. Thus, dual use of signal pins on the multiple use core logic chip set may reduce the overall pin count, further reducing manufacturing costs.

For illustrative purposes preferred embodiments of the present invention are described hereinafter for computer systems utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP and PCI interface standards.

The PCI specifications referenced above are readily available and are hereby incorporated by reference. The AGP specification entitled "Accelerated Graphics Port Interface Specification Revision 1.0," dated Jul. 31, 1996, as referenced above is readily available from Intel Corporation, and is hereby incorporated by reference. Further definition and enhancement of the AGP specification referenced above is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned co-pending U.S. patent application Ser. No. 08/853,289, filed May 9, 1997, entitled "Dual Purpose Apparatus, Method and System for Accelerated Graphics Port and Peripheral Component Interconnect" by Ronald Horan and Paul Olarig, and which is hereby incorporated by reference. A description of Registered PCI (RegPCI) is disclosed in U.S. patent application Ser. No. 08/873,636, filed Jun. 12, 1997, and entitled "Registered PCI" by Dwight Riley and Christopher J. Pettey, as incorporated by referenced above.

Figure 1A:
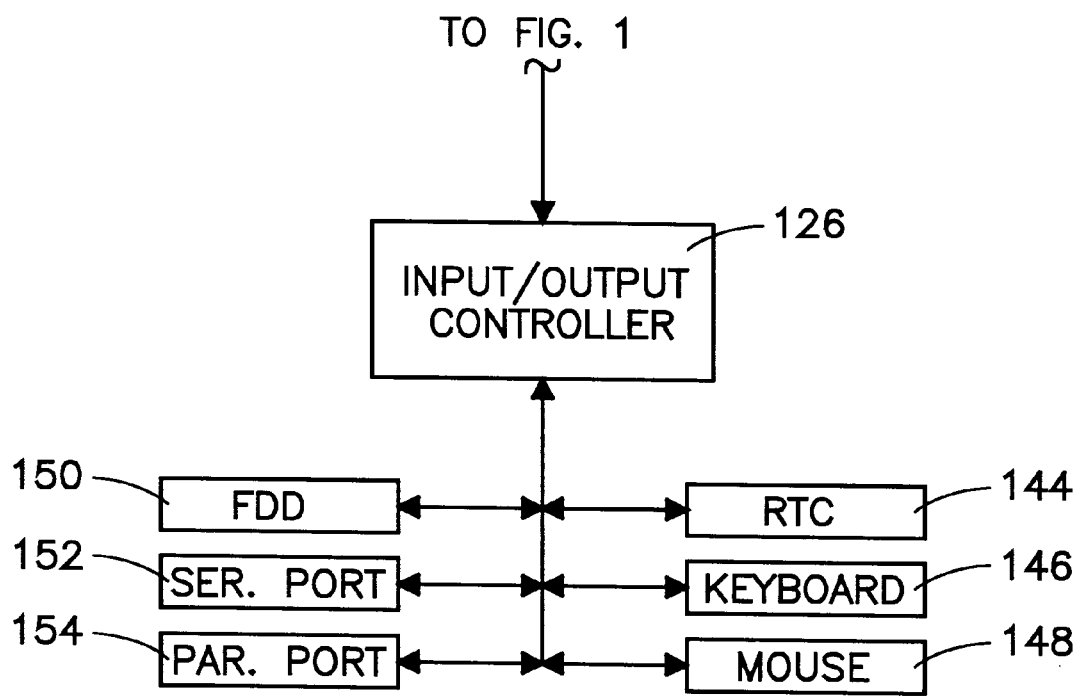

Referring now to the drawings, the details of preferred embodiments of the present invention are schematically illustrated. Like elements in the drawings will be represented by like numbers, and similar elements will be represented by like numbers with a different lower case letter suffix. Referring now to FIGS. 1 and 1A, a schematic block diagram of a computer system utilizing the present invention is illustrated. A computer system is generally indicated by the numeral 100 and comprises a central processing unit ("CPU") 102, core logic 104, system random access memory ("RAM") 106, a video graphics controller 110, a local frame buffer memory 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computers. The CPU 102 may be a plurality of CPUs 102 in a symmetric or asymmetric multi-processor configuration.

Figure 5:
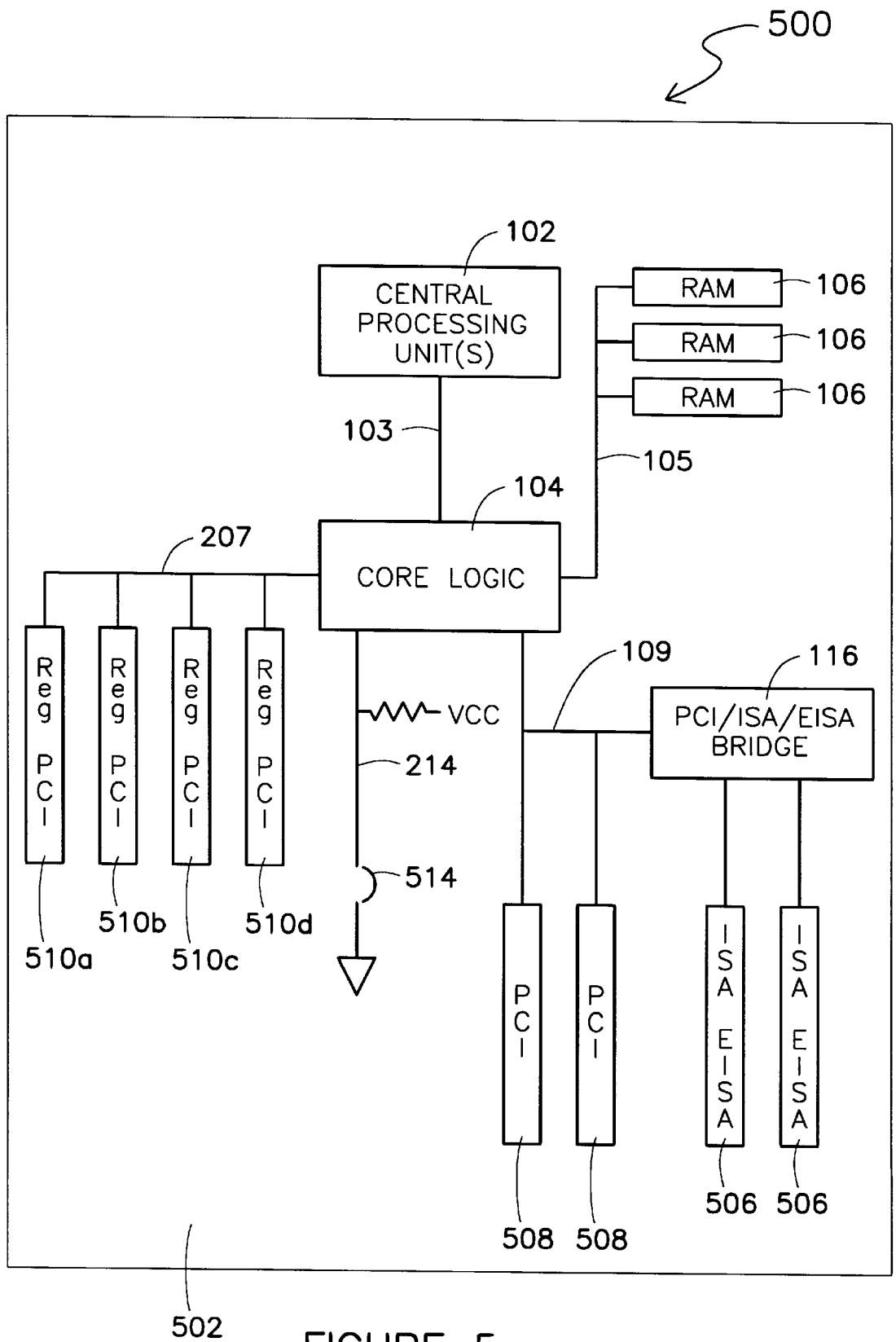
FIGS. 5 and 5A are schematic plan views of computer system motherboards, according to the present invention.
Figure 5A:
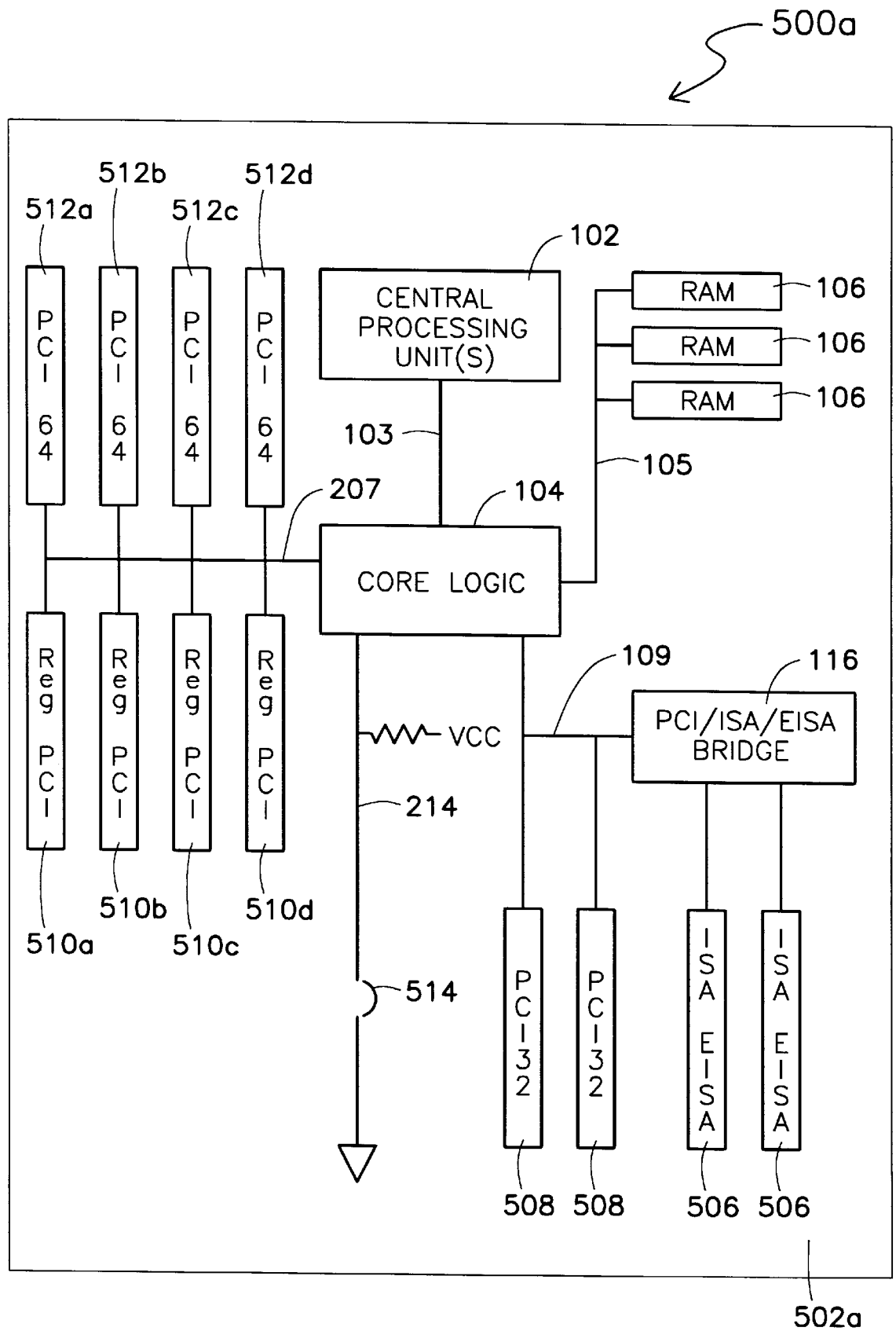

The CPU 102 is connected to the core logic 104 through a host bus 103. The system RAM 106 is connected to the core logic 104 through a memory bus 105. The video graphics controller 110 is connected to the core logic 104 through an AGP or RegPCI bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122, and a PCI/PCI bridge 124. Some of the PCI devices such as the NIC 122 and PCI/PCI bridge 124 may plug into PCI connectors on the computer system 100 motherboard (FIGS. 5 and 5A).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone hie 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113. The PCI/IDE controller 118 interfaces to an IDE disk 128 and IDE CD ROM drive 134.

Figure 2:
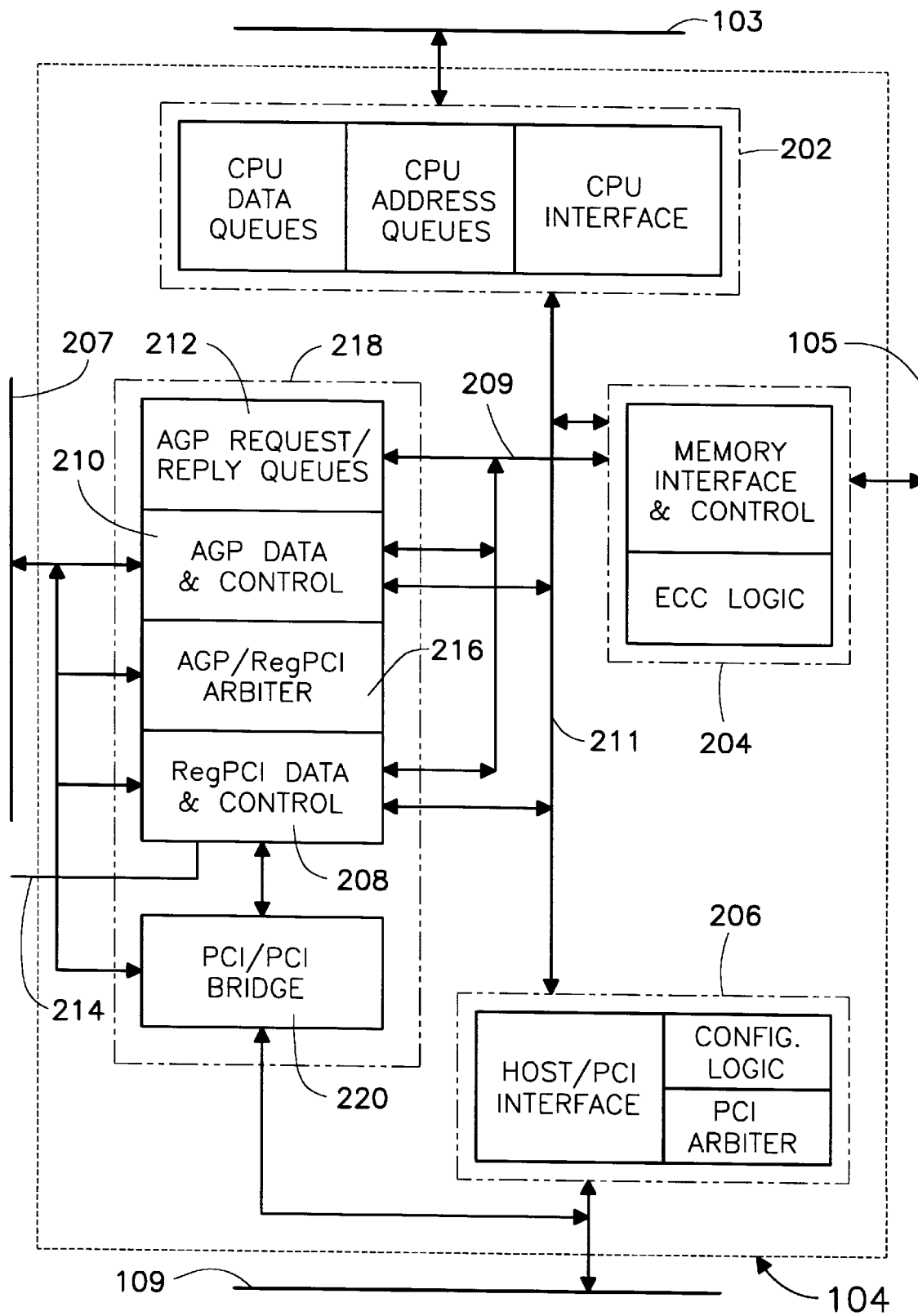
FIG. 2 is a schematic functional block diagram of an embodiment of the present invention added to the computer system of FIG. 1.

Referring now to FIG. 2, a schematic functional block diagram of the core logic 104 of FIG. 1, according to the present invention, is illustrated. The core logic 104 functionally comprises a CPU host bus interface and queues 202, memory interface and control 204, host/PCI bridge 206, and AGP/RegPCI logic 218. The AGP/RegPCI logic 218 comprises RegPCI data and control 208, AGP/RegPCI arbiter 216, AGP data and control 210, and AGP request/reply queues 212. The CPU host bus interface and queues 202 connects to the host bus 103 and includes interface logic for all data, address and control signals associated with the CPU 102 of the computer system 100. Multiple CPUs 102 and cache memory (not illustrated) are contemplated and within the scope of the present invention. The CPU host bus interface and queues 202 interfaces with the host/PCI bridge 206 and memory interface and control 204 over a core logic bus 211. The CPU host bus interface and queues 202 interfaces with the RegPCI data and control 208, AGP data and control 210, and AGP request/reply queues 212 over a core logic bus 211. The memory interface and control 204 interfaces with the RegPCI data and control 208, AGP data and control 210, and AGP request/reply queues 212 over a core logic bus 209. An advantage of having individual core buses 209 and 211 is that concurrent bus operations may be performed thereover. For example, video data stored in system RAM 106 may be transferring to the video graphics controller 110 (AGP device) while the CPU 102 on the host bus 103 is accessing an independent PCI device (i.e., NIC 122) on the PCI bus 109.

The host bus interface and queues 202 allows the CPU 102 to pipeline cycles and schedule snoop accesses. The memory interface and control 204 controls the control and timing signals for the computer system RAM 106 which may be synchronous dynamic RAM and the like. The memory interface and control 204 has an arbiter (not illustrated) which selects among memory accesses for CPU writes, CPU reads, PCI writes, PCI reads, AGP reads, AGP writes, and dynamic memory refresh. Arbitration may be pipelined into a current memory cycle, which insures that the next memory address is available on the memory bus 105 before the current memory cycle is complete. This results in minimum delay, if any, between memory cycles. The memory interface and control 204 also is capable of reading ahead on PCI initiator reads when a PCI initiator issues a read multiple command, as more fully described in the PCI 2.1 Specification.

The host/PCI bridge 206 controls the interface to the PCI bus 109. When the CPU 102 accesses the PCI bus 109, the host/PCI bridge 206 operates as a PCI initiator. When a PCI device is an initiator on the PCI bus 109, the host/PCI bridge 206 operates as a PCI target. The host/PCI bridge 206 contains base address registers for an AGP device target (not illustrated).

The AGP/RegPCI logic 218 comprises a PCI/PCI bridge 220, RegPCI data and control 208, AGP/RegPCI arbiter 216, AGP data and control 210, and AGP request/reply queues 212. The RegPCI data and control 208, AGP data and control 210, and AGP request/reply queues 212 interface to a universal AGP/RegPCI bus 207 having signal, power and ground connections (not illustrated) for implementation of the AGP interface standard or the RegPCI standard An AGP/PCI control 214 may be used to select the personality function of the AGP/RegPCI logic 218 to be an AGP compliant interface or to be a RegPCI compliant interface, depending on the desired purpose of the computer system 100. The AGP/RegPCI control 214 may be implemented in hardware (jumper straps) or through software (configuration of personality registers in 208, 210 and 212). These personality registers are more fully defined in the AGP specifications incorporated herein by reference The universal AGP/RegPCI bus 207 is adapted to connect to either a standard AGP connector or standard PCI connectors as more fully described herein below.

The PCI/PCI bridge 220 is connected between the PCI bus 109 and the RegPCI data and control 208. The PCI/PCI bridge 220 need not be a complete and fully functional PCI to PCI bridge when the AGP/PCI logic 218 is functioning as an AGP compliant interface. In the AGP compliant mode, the purpose of the PCI/PCI bridge 220 is to allow the use of existing enumeration code (unmodified) to recognize and handle AGP or RegPCI compliant devices residing on the AGP/RegPCI bus 207. The PCI/PCI bridge 220, for example, may be used in determining whether an AGP device or a RegPCI device(s) is connected to the AGP/RegPCI bus 207 by bus enumeration during POST.

When selected as a PCI compliant interface, the AGP/RegPCI logic 218 functions with the same capabilities as the primary host/PCI bridge 206. In this case, the AGP/RegPCI logic 218 becomes a second host/PCI bridge and the AGP/RegPCI bus 207 becomes the second (additional) RegPCI bus in the computer system. The PCI bus 109 is the primary PCI bus and is assigned a logical PCI bus number of zero. The additional RegPCI bus (AGP/RegPCI bus 207) may typically be assigned a logical PCI bus number of one. It is contemplated, however, in the present invention that another embodiment thereof may present to the computer system 100 both PCI bus 109 and the additional PCI bus (AGP/RegPCI bus 207) as a single logical PCI bus number zero. This allows a single logical PCI bus to have more PCI connectors. i.e., more PCI cards on the same PCI bus number. This is especially important when utilizing PCI devices running at a clock frequency of 66 MHz. Device arbitration and signal synchronization would be accomplished in the core logic 104 between the two host/PCI bridges.

In another embodiment when the AGP/RegPCI bus 207 is serving as an additional 66 MHz RegPCI bus, the PCI/PCI bridge 220 in combination with AGP/RegPCI logic 218 may be used as a full function PCI/PCI bridge between the PCI bus 109 and the AGP/RegPCI bus 207. In this embodiment of the present invention, transactions between the host bus 103 and the AGP/RegPCI bus 207 would have to go through both the host/PCI bridge 206 and the now fully functional PCI/PCI bridge 220.

Figure 2A:
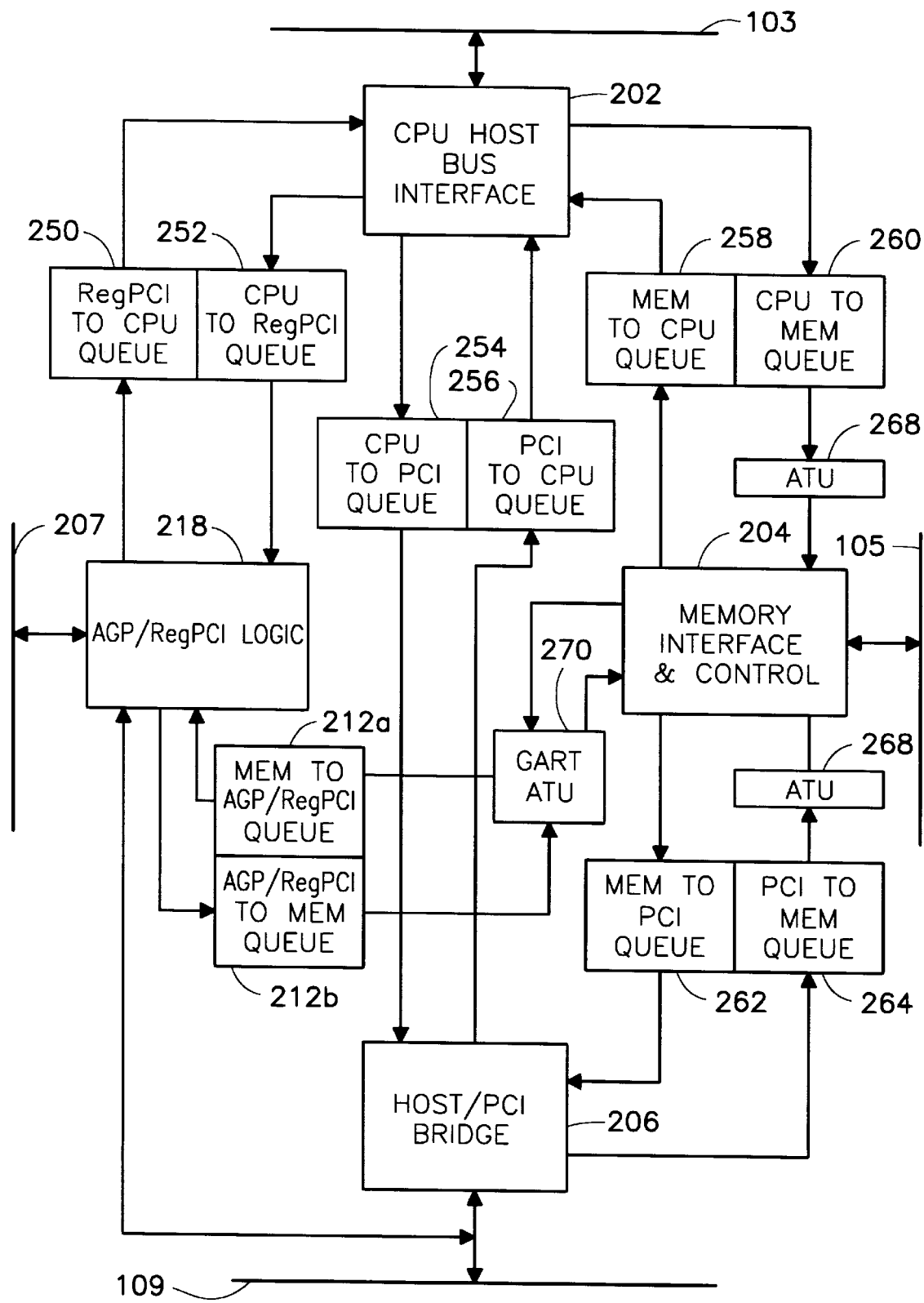
FIG. 2A is a data flow block diagram of FIG. 2.

Referring now to FIG. 2A, a data flow block diagram of the core logic 104 of FIG. 2, according to the present invention, is illustrated. The core logic 104 communicates through the various queues, read registers, and other control signals (not illustrated). Separating the major function blocks (202, 204, 206 and 218) as illustrated and coupling these function blocks together with read and write queues allows for a significant amount of concurrency in the computer system.

There are ten address and data queues illustrated in FIG. 2A. The queues receiving information (address and data) from the CPU are: CPU to memory queue 260, CPU to PCI queue 254, and CPU to RegPCI queue 252. Data directed to the system memory (RAM 106) has the respective base addresses translated to the system memory address space by address translation units ("ATU") 268.

The queues receiving information directed to the CPU are: memory to CPU queue 258, PCI to CPU queue 256, and RegPCI to CPU queue 250. Memory to PCI queue 262 receives information from the memory interface and control 204 that is directed to the host/PCI bridge 206. PCI to memory queue 264 receives information from the host/PCI bridge 206 that is directed to the memory interface and control 204. Memory to AGP/RegPCI queue 212a receives information from the memory interface and control 204 that is directed to the AGP/RegPCI logic 218. AGP/RegPCI to memory queue 212b receives information from the AGP/RegPCI logic 218 that is directed to the memory interface and control 204. A graphic address remapping table ("GART") ATU 270 translates the AGP texture data addresses to and from the system memory address space. The GART ATU 270 has a memory address table as more fully defined in the AGP specification.

The CPU to memory queue 260 handles CPU 102 posted writes to the RAM 106. The CPU to PCI queue 254 handles CPU 102 writes to the primary PCI bus 109. The CPU to PCI queue 252 handles CPU 102 writes to either an AGP device or a PCI device on the universal AGP/PCI bus 207.

The system memory (RAM 106) reads by the CPU 102 are queued in the memory to CPU queue 258. Reads from the PCI devices on the primary PCI bus 109 are queued in the PCI to CPU queue 256. Reads from the AGP device or RegPCI device(s) on the universal AGP/RegPCI bus 207 are queued in the RegPCI to CPU queue 250. With the queues 212a, 212b, 250, 252, the AGP/RegPCI logic 218 has the same capabilities as the host to PCI bridge 206 when configured as an additional host to PCI bridge.

A configuration bit determines whether a PCI device will use the PCI standard or registered protocol. This mode bit may be located in the Command Register at bit position 10 for all header types, but any location in the standard configuration header is contemplated herein. To identify a RegPCI device, configuration software does a write to the RegPCI mode bit then reads it to determine if this bit can be set. In addition, a plug-in RegPCI device which does not meet the non-registered 66 MHz PCI 2.1 Specification should use a 470 ohm resistor to pull the M66EN to ground. This allows the PCI bus to startup in the 33 MHz mode and then after the aforementioned software configuration testing, the 66 MHz RegPCI mode may be used if all of the PCI devices on the bus are RegPCI mode compatible.

Since Registered PCI is an extension of the existing signaling and bus protocol of the PCI 2.1 Specification, standard PCI devices may be utilized with a computer system equipped with a RegPCI bus. Any 33 MHz PCI device may be connected to the RegPCI bus but then the RegPCI bus will only run at 33 MHz regardless of the capabilities of the other PCI devices connected thereto. If only 66 MHz PCI devices are connected to the RegPCI bus, then the RegPCI bus may run at 66 MHz providing the RegPCI bus does not introduce excess propagation delay, i.e., more than two PCI connectors on the bus. RegPCI devices have the advantage of providing high-speed register-to-register transfers on a PCI bus having more than two connectors and at a sustained burst clock speed of 66 MHz or higher. In the RegPCI mode all signals are sampled on the rising edge of the clock and only the registered version of these signals are used inside the RegPCI device. The PCI 2.1 Specification includes many cases where the state of an input signal setting up to a particular clock edge affects the state of an output signal after that same clock edge. Since this is not possible in a registered PCI interface, RegPCI introduces the concept of a clock-pair boundary, which replaces some single-clock-edges where control signals change. Data phases still come one per rising clock edge, but once the RegPCI initiator (master) and RegPCI target use IRDY# and DEVSEL# (PCI signals) to identify the start of the first clock pair, control signals generally switch only on clock-pair boundaries.

Registered PCI does not use side-band signals as does the AGP protocol and has no reserved commands. The only changes to the PCI 2.1 Specification are the following rules which apply only when all PCI devices on the bus are configured in the RegPCI mode. In standard PCI mode, these rules do not apply. RegPCI is optimized for burst data transfers, Single data-phase transactions may suffer some performance degradation for the sake of protocol simplicity and consistency.

A key concept to the following description of the registered protocol is the clock pair. Since all control signals are sampled on a clock edge before they can be used to manage the interface, most control signal changes occur on a clock-pair boundary, and are detected by the other device in the middle of a clock pair. Data phases continue to be one clock long. This requires, in RegPCI mode, that data phases and wait states always come in pairs. An exception is the single-data-phase transaction.

In the RegPCI mode, all signals are sampled at one clock before they are to be used by the RegPCI device, internally the RegPCI device uses the sampled signal on the next clock and all outputs are clocked directly out of the RegPCI device on this next clock. The following restrictions apply to the PCI 2.1 Specification protocol when using the RegPCI mode (all signal name references used herein are defined more fully in the PCI 2.1 Specification):

IRDY# can be asserted no later than one clock alder the address phase. "Fast" address decode and DEVSEL# assertion are not possible. The first clock-pair boundary is defined to be the rising edge of the clock after the clock where DEVSEL# is asserted.

If the transaction is a burst, i.e., if FRAME# stays asserted after IRDY# is asserted and the target is prepared to take more that a single data phase, then the following rules apply: From the time DEVSEL# is asserted, FRAME#, IRDY#, TRDY#, STOP# and DEVSEL# can only change on a clock-pair boundary. This has the following effects: Data phases always come in pairs. Wait states always come in pairs, and only occur on even numbered data-phase clock boundaries. The "last" data phase in the standard PCI 2.1 Specification protocol (the data phase between the time FRAME# deasserts and IRDY# deasserts) becomes two data phases in the RegPCI mode. Data stepping is not possible.

In the RegPCI mode, transactions must begin on an 8-byte boundary for 32 bit transfers or on a 16-byte boundary for 64 bit transfers. If the consumer of data signals is not ready for the data, then the producer of the data is not required to keep the data on the bus throughout the clock pair. For write transactions, the BE# bits are only required to be valid when the data is required to be valid.

If a RegPCI mode transaction has a single data phase, then the following rules apply: From the time DEVSEL# is asserted, FRAME#, IRDY#, STOP#, and DEVSEL# can only change on a clock-pair boundary. TRDY# asserts on a clock-pair boundary and deassertes one clock thereafter.

Further restrictions when in the RegPCI mode are as follows: If a bus agent detects a data parity error, it will assert PERR# on the clock after PAR is sampled, which is one clock later than in standard mode PCI. A PCI initiator (master) can assert FRAME# no earlier than the second clock after its GNT# is asserted. A PCI device is allowed to assert FRAME# on the clock after its GNT# is deasserted. After a PCI initiator (master) is retried by a PCI target, the initiator must negate its REQ# for a minimum of four clocks. Further details on operating parameters of the RegPCI mode may be found in commonly owned U.S. patent application Ser. No. 08/873,636, filed Jun. 12, 1997, and entitled "Registered PCI" by Dwight Riley and Christopher J. Pettey, incorporated herein above by reference.

Referring to now FIGS. 3A–3C and 4A–4E, tables of the AGP/PCI signals and the corresponding AGP (FIGS. 3A–3C) and PCI (FIGS. 4A–4E) connector pin outs, according to the AGP and PCI specifications, are illustrated. The 66 MHz, 64 bit, 3.3 volt PCI connector pin out is represented in FIGS. 4A–4E for illustrative clarity, but the 5 volt and universal PCI card connector pin outs (as more fully defined in the PCI specification) are also contemplated and within the scope of the present invention. The universal AGP/RegPCI bus 207 is comprised of the AGP and PCI signals disclosed in FIGS. 3A–3C and 4A–4D, and the bus 207 is adapted for connection to a desired AGP connector, or 66 MHz, RegPCI connector(s). Selection of which interface specification the logic bridge conforms to (AGP or RegPCI) by the core logic 104 is controlled by the AGP/RegPCI control 214. The pins 302 of the AGP connector (FIGS. 3A–3C) are connected to the AGP only signals 304, and AGP and PCI signals 306 of the AGP/RegPCI bus 207 (FIG. 2). The pins 402 of the RegPCI connector(s) (FIGS. 4A–4E) are connected to the AGP and PCI signals 306, and PCI only signals 408 of the AGP/RegPCI bus 207 (FIG. 2).

Referring to FIGS. 5 and 5A, schematic block diagrams of computer system motherboards are illustrated in plan view. The computer system motherboards 500 and 500a comprise printed circuit boards 502 and 502a, respectively, on which components and connectors are mounted thereto. The printed circuit boards 502, 502a comprise conductive printed wiring 504 which is used to interconnect the components and connectors thereon. The conductive printed wiring (illustrated as buses 103, 105 109 and 207) may be arranged into signal buses having controlled impedance characteristics. On the printed circuit boards 502, 502a are the core logic 104, CPU(s) 102, RAM 106, PCI/ISA/EISA bridge 116, ISA/EISA connectors 506, 66 MHz, 32 bit PCI connectors 508 (primary PCI bus 109), and additional 66 MHz, 32 bit RegPCI connectors 510a–510d. The RegPCI connectors 510 are the same standard PCI connectors as PCI connectors 508.

The core logic 104 is multiple use, operable as either an AGP interface or an additional 66 MHz RegPCI interface, and may be configured for either an AGP interface or an additional RegPCI interface connected to the RegPCI connectors 510a–510d. Hardware jumper 514 may be utilized to select the core logic 104 interface AGP/RegPCI personality, or configuration registers within the core logic 104 may be set by software during system configuration or POST after enumerating the various computer system buses to determine what peripheral cards have been plugged into the system motherboards 500, 500a. A feature of the present invention allows automatic configuration of the core logic as an AGP interface if an AGP compliant device (not illustrated) is detected on the universal bus 207 or as an additional RegPCI interface if RegPCI cards are detected in the RegPCI card connectors 510a–510d. The PCI connectors 508 are connected to the computer system primary PCI bus 109 (logical PCI bus number zero) which may run at either 66 MHz or 33 MHz. The primary PCI bus 109 (connectors 508) may be used for PCI devices such as PCI/SCSI or PCI/IDE adapters, the additional RegPCI bus (connectors 510a–510d) may be used when more than two 66 MHz, 32 bit RegPCI devices are required. PCI extension connectors 512a–512d (FIG. 5A) are utilized for 64 bit RegPCI devices. The PCI extension connectors 512a–512d are standard PCI connectors as more fully described in the PCI 2.1 Specification.

An advantage of the present invention is that it allows the computer system 100 to utilize more than two of the higher data throughput (bandwidth) RegPCI devices such as additional video graphics controller cards or high speed NICs by using the RegPCI mode at a 66 MHz or higher data throughput.

Figure 6:
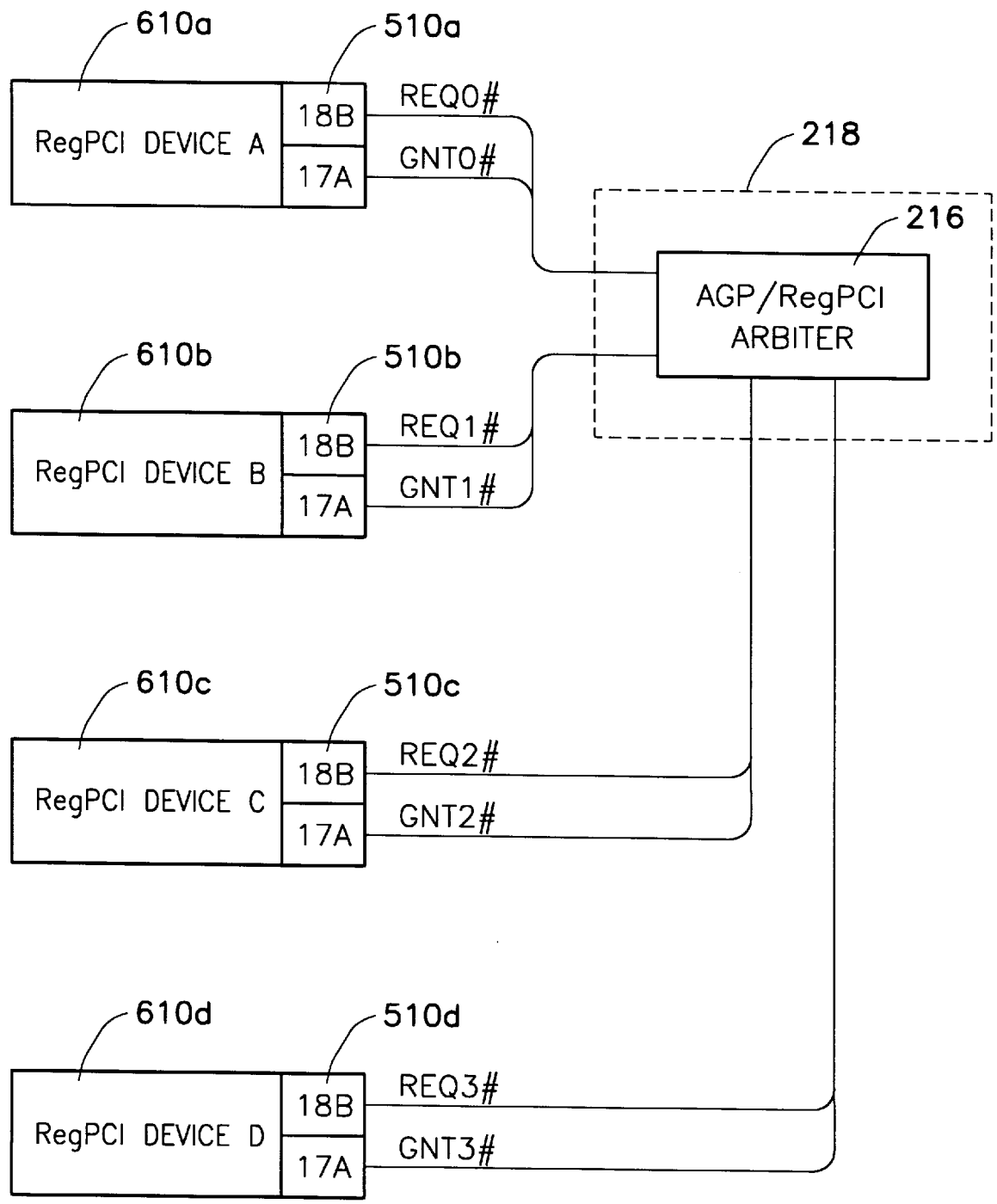
FIG. 6 is a schematic block wiring diagram of a portion of the embodiment of the present invention according to FIGS. 5 and 5A.

Referring now to FIG. 6, a schematic block wiring diagram of a portion of the embodiment of the present invention according to FIGS. 5 and 5A is illustrated. Each PCI device card inserted into the PCI connectors 510a–510d require request (REQ#) and grant (GNT#) signals. According to the PCI 2.1 Specification, a PCI device is selected and allowed to become the PCI bus initiator when it asserts its respective REQ# signal onto the PCI bus and the PCI arbiter acknowledges the PCI device bus initiator request by asserting the respective GNT# signal back to PCI device requesting the PCI bus. In the multiple use core logic 104 of the present invention, a plurality of request and grant signals are available for either an AGP bus device or additional RegPCI bus devices 610a–610d. This is partially illustrated by PCI connector 510a connected to REQ0# and GNT0# signals, PCI connector 510b connected to REQ1# and GNT1# signals, PCI connector 510c connected to REQ2# and GNT2# signals, and PCI connector 510d connected to REQ3# and GNT3# signals, all from the AGP/RegPCI arbiter 216 of the AGP/RegPCI logic 218. The connectors 512 (FIG. 5A) carry the additional signals required for 64 bit RegPCI operation. Thus, the multiple use core logic chip set of the present invention may be configured for a computer system having either an AGP compliant bus or an additional 66 MHz RegPCI bus, depending only upon the configuration of the printed circuit board 502 or 502a. In this way one multiple use core logic chip set may be utilized for many differently configured computer systems from simple portable and consumer personal computers to high end workstations and network servers.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chip set configurable for either an accelerated graphics port (AGP) bus or an additional registered peripheral component interconnect (RegPCI) bus, said system comprising:

a central processing unit connected to a host bus;

a random access memory connected to a random access memory bus;

a core logic chip set connected to the host bus and the random access memory bus;

said core logic chip set configured as a first interface bridge between the host bus and the random access memory bus, a second interface bridge between the host bus and a first peripheral component interconnect bus, and a third interface bridge between the random access memory bus and the first peripheral component interconnect bus;

said core logic chip set configured as a fourth interface bridge between the host bus and a second registered peripheral component interconnect bus; and said core logic chip set configured as a fifth interface bridge between the random access memory bus and the second registered peripheral component interconnect bus.

2. The computer system of claim 1, wherein the central processing unit is a plurality of central processing units.

3. The computer system of claim 1, wherein the core logic chip set is at least one integrated circuit.

4. The computer system of claim 3, wherein the at least one integrated circuit core logic chip set is at least one application specific integrated circuit.

5. The computer system of claim 3, wherein the at least one integrated circuit core logic chip set is at least one programmable logic array integrated circuit.

6. The computer system of claim 1, further comprising at least one peripheral component interconnect device, the at least one peripheral component interconnect device connected to the second registered peripheral component interconnect bus.

7. The computer system of claim 6, wherein the at least one peripheral component interconnect device is at least one 32 bit peripheral component interconnect device.

8. The computer system of claim 6, wherein the at least one peripheral component interconnect device is at least one 64 bit peripheral component interconnect device.

9. The computer system of claim 6, wherein the at least one peripheral component interconnect device is at least one registered peripheral component interconnect device.

10. The computer system of claim 1, wherein the host bus, random access memory bus, first peripheral component interconnect bus, and second registered peripheral component interconnect bus are on a computer system printed circuit board.

11. The computer system of claim 10, wherein the fourth and fifth interface bridges of said core logic chip set are configured for the second registered peripheral component interconnect bus by an electrical signal sent from a hard-wired jumper circuit located on the printed circuit board of the computer system.

12. The computer system of claim 1, wherein the fourth and fifth interface bridges of said core logic chip set are configured for the second registered peripheral component interconnect bus by software control of said core logic chip set.

13. The computer system of claim 12, wherein the fourth and fifth interface bridges of said core logic chip set are configured for the second registered peripheral component interconnect bus when a peripheral component interconnect device is detected.

14. The computer system of claim 13, wherein configuration of said core logic chip set is done during power on self test of the computer system.

15. The computer system of claim 13, wherein configuration of said core logic chip set is done during configuration of the computer system.

16. The computer system of claim 10, wherein at least one peripheral component interconnect connector is on the printed circuit board and connected to the second registered peripheral component interconnect bus.

17. A method, in a computer system, of configuring a core logic chip set for either an accelerated graphics port (AGP) bus or an additional registered peripheral component interconnect (RegPCI) bus, said method comprising the steps of:

providing a central processing unit connected to a host bus;

providing a random access memory connected to a random access memory bus;

providing a core logic chip set connected to the host bus and the random access memory bus;

configuring said core logic chip set as a first interface bridge between the host bus and the random access memory bus, a second interface bridge between the host bus and a first peripheral component interconnect bus, and a third interface bridge between the random access memory bus and the first peripheral component interconnect bus; and configuring said core logic chip set as a fourth interface bridge between the host bus and a second registered peripheral component interconnect bus and a fifth interface bridge between the random access memory bus and the second registered peripheral component interconnect bus when a configuration signal is applied to said core logic chip set.

18. The method of claim 17, wherein the configuration signal is applied to said core logic chip set when a peripheral component interconnect device is detected on the second registered peripheral component interconnect bus.

19. The method of claim 18, wherein the peripheral component interconnect device is detected during a power on self test of the computer system.

20. The method of claim 18, wherein the peripheral component interconnect device is detected during a configuration of the computer system.

21. The method of claim 18, wherein the peripheral component interconnect device is a 32 bit peripheral component interconnect device.

22. The method of claim 18, wherein the peripheral component interconnect device is a 64 bit peripheral component interconnect device.

23. The method of claim 18, wherein the peripheral component interconnect device is a registered peripheral component interconnect device.

24. The method of claim 23, wherein the peripheral component interconnect device is detected by writing a bit pattern to a configuration register in the registered peripheral component interconnect device and then reading the configuration register to determine if a registered peripheral component interconnect bit was set by the bit pattern.

25. A core logic chip set configurable for either an accelerated graphics port (AGP) bus or an additional registered peripheral component interconnect (RegPCI) bus, comprising:

an accelerated graphics port (AGP) request queue;

an AGP reply queue;

an AGP data and control logic;

an AGP and registered peripheral component interconnect (RegPCI) arbiter;

a RegPCI data and control logic; and a peripheral component interconnect (PCI) to PCI bridge;

said AGP request and reply queues connected to a memory interface and control logic, said memory and interface control logic adapted for connection to a computer system random access memory;

said AGP data and control logic connected to said memory and interface control logic;

said RegPCI data and control logic connected to said memory and interface control logic;

said AGP data and control logic and RegPCI data and control logic connected to a host bus interface, said host bus interface adapted for connection to a computer system host bus having at least one central processing united connected thereto;

a host to PCI bus bridge connected to said host bus interface and adapted for connection to a computer system primary PCI bus;

said PCI to PCI bridge connected to said AGP data and control logic, and said RegPCI data and control logic, wherein said PCI to PCI bridge transfers PCI information transactions between said Host to primary PCI bus bridge and said AGP data and control logic, and said RegPCI data and control logic; and said AGP data and control logic, said RegPCI data and control logic, and said AGP and RegPCI arbiter adapted for connection to either an AGP bus or a PCI bus.

26. The core logic chip set according to claim 25, wherein said RegPCI data and control logic, and said AGP and RegPCI arbiter are adapted for connection to a plurality of PCI devices.

27. The core logic chip set according to claim 26, wherein the plurality of PCI devices are a plurality of RegPCI devices.

28. The core logic chip set according to claim 27, wherein the plurality of RegPCI devices are configured for 66 megahertz (MHz), 32 bit operation.

29. The core logic chip set according to claim 27, wherein the plurality of RegPCI devices are configured for 66 megahertz (MHz), 64 bit operation.

30. The core logic chip set according to claim 26, wherein said RegPCI data and control logic, and said AGP and RegPCI arbiter are configured for the plurality of PCI devices by a hardware jumper applying a control signal to said core logic chip set.

31. The core logic chip set according to claim 26, wherein said RegPCI data and control logic, and said AGP and RegPCI arbiter are configured for the plurality of PCI devices by software configuring a control register in said core logic chip set.

* * * * *